Figure 1:
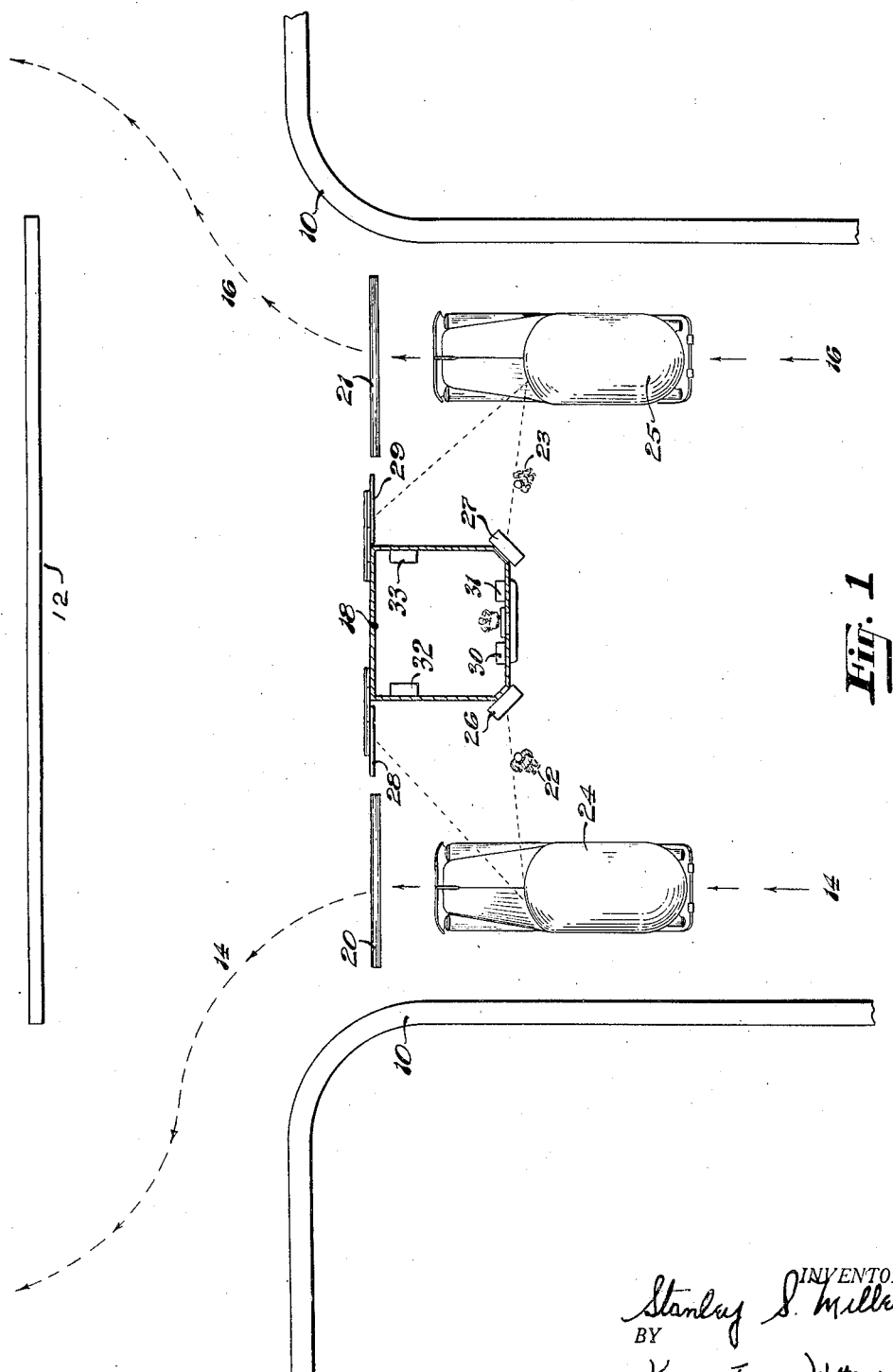

Nov. 8, 1949     S. S. MILLER     2,487,463
ADMISSION INDICATOR

Filed Feb. 3, 1948     2 Sheets-Sheet 1

Nov. 8, 1949  S. S. MILLER  2,487,463
ADMISSION INDICATOR
Filed Feb. 3, 1948  2 Sheets-Sheet 2
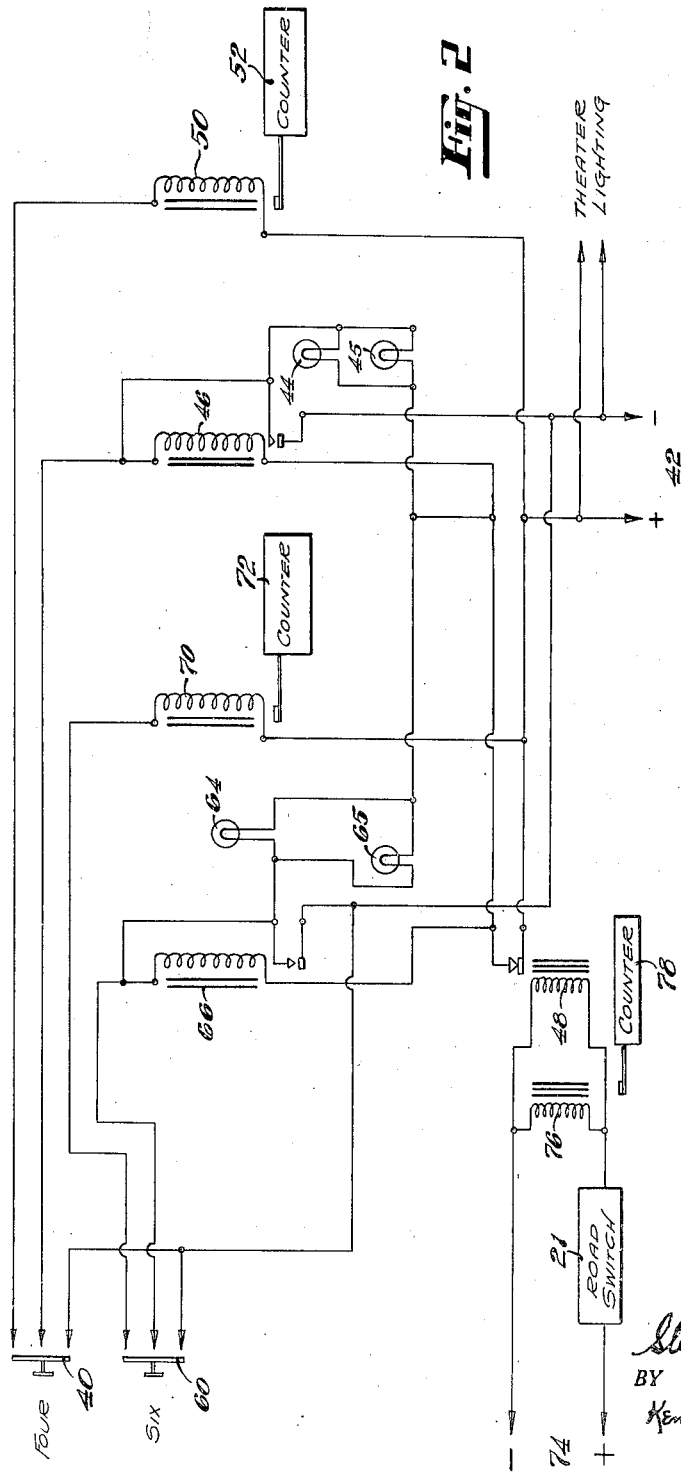
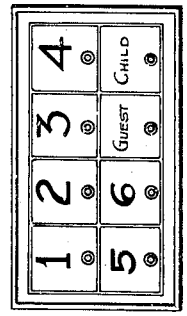
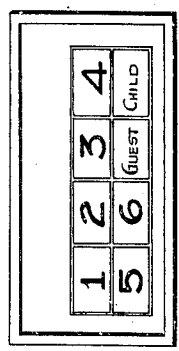
INVENTOR.
Stanley S. Miller
BY
Kenway, Jenney, Witter & Hildreth
Attys Patented Nov. 8, 1949

2,487,463

UNITED STATES PATENT OFFICE 2,487,463

ADMISSIONS INDICATOR

Stanley S. Miller, Boston, Mass.

Application February 3, 1948, Serial No. 5,944

1 Claim. (Cl. 235—92)

This invention relates to an entrance indicator for vehicles and their occupants and more especially to an indicating and counting device for use at the entranceways of open-air theatres, auditoriums, and other inclosures, to provide a visual indication of the number of occupants of a car passing through such entranceways as well as to count the total number of cars and occupants admitted.

In the operation of open-air theatres, the cashier's booth is necessarily located at one side of each vehicle passageway which gives rise to the custom of maintaining an attendant stationed at the entrance. The duties of the attendant are to step to the side of the incoming car and check the number of occupants; to collect money for tickets; and then to deposit the money with the cashier. Since the cashier, manager, or other supervisor may not be able to observe, with any degree of certainty, the number of car occupants, and the occupants do not see the money deposited, an opportunity is present for the attendant to deposit with the cashier an amount less than that received from the occupants, thus retaining the balance and defrauding the proprietors. It will also be apparent that in this situation, neither the cashier nor the occupants have any way of knowing what has occurred.

The device of the invention is designed especially to deal with this situation and to provide means for prominently displaying within the range of vision of both the cashier and the occupants, the number of paid admissions in each instance. An important feature therefore consists in an electrically operated sign bearing a plurality of numbered sections, any one of which may be illuminated to display prominently to both the cashier and the occupants of a car driving into an open-air theatre the number of admissions reported by the attendant. Alternatively this indicator may have numbered sections on the rear as well as the front, thus rendering any admission visible to the manager or other supervisor within the inclosure.

Another feature of the invention is the combination with the illuminated sign of a series of electrically operated counters by means of which a record of the number of admissions may be kept concurrently with illuminating the sign.

Still another feature is a system of relays and switches cooperating with a road switch to perform simultaneously two other important functions. One consists in discontinuing illumination of a sign section or number as the car enters the inclosure. The other involves counting the number of vehicles passing over the road switch so that in conjunction with the counters recording admissions, a record may be kept of the average number of passengers per car as well as of the distributed passenger groupings. Thus even in the event that the visual display is occasionally not operated, total admissions can still be approximated by car counter readings based on usual passenger groupings.

These and other features are illustrated in a preferred embodiment of the invention illustrated in the accompanying drawings, in which:

Fig. 1 is a diagrammatic view illustrating an inclosure of the open-air theatre type, at one side of which is located the indicator sign of the invention, Fig. 2 is a schematic circuit diagram of one complete indicator circuit, Fig. 3 is a detail elevational view of the indicator member, and Fig. 4 is a detail elevational view of the switchbox.

The principal parts of the indicator mechanism for each entry lane include an indicator sign prominently displayed at the theatre entrance as well as an indicator unit within the cashier's booth, a multiple switch unit located in the vicinity of the cashier's booth and a road switch arranged in the path of movement of the wheels of a vehicle which is about to enter the inclosure. Counter mechanism associated with the switch unit may be located at any convenient point.

One general plan of the apparatus has been suggested in Fig. 1 in which numeral 10 denotes an inclosure consisting of the usual fencing employed in drive-in theatres, and 12 is a theatre screen member. Arrows 14 and 16 indicate car entranceways. Between the entranceways is a cashier's booth 18, while the road switches 20 and 21 lying across the entranceways are disposed across each entrance to the inclosure.

In the customary operation of the theatre, attendants are stationed at points 22 and 23 near the cashier's booth 18. As cars 24 and 25 approach the booth, the attendants step into position to receive money from the drivers or other occupants, and then move back to the cashier's booth to purchase tickets in the usual manner. As the attendants do so, they indicate by depressing on switchboards 26 or 27 the pushbutton corresponding to the number of occupants of the car. This number appears illuminated on the sign 28 or 29 viisble to the occupants of the car, and the number also appears illuminated on the desk-size indicators 30 or 31 within the cashier's office. It will be understood that switchboard 26 operates indicators 28 and 30, while the switchboard 27 operates indicators 29 and 31. The design of the indicators (whether desk or outside type) is shown in Fig. 3. Fig. 4 shows the design of push-button switchboards 26 and 27.

Further reference to Fig. 1 reveals wall cabinets 32 and 33 containing several conventional counters and located inside the cashier's booth 18. The counters are so connected to the electrical circuit of the push-button switches 26 and 27, and the indicators 28, 29, 30, and 31, that when a push-button, for example, "four," is depressed momentarily on the left switchboard 26, the numeral "four" appears on the left indicators 28 and 30, and the counter designated as the "four" counter in cabinet 32 automatically adds one more unit. Similarly, when the "four" push-button is depressed on the right-hand switchboard 27, the numeral "four" appears on the right indicators 29 and 31, and the "four" counter unit in the right-hand cabinet 33 automatically adds one more unit.

Thus the counters in cabinets 32 and 33 maintain running totals of admissions where there is one occupant, two occupants, three occupants, etc. As will be seen the counters also keep totals of the number of vehicles which enter the theatre. In order to ascertain the cumulative number of occupants admitted during any period, the supervisor multiplies the number shown on the "two" counter by two; similarly, he multiplies the number shown on the "three" counter by three. These various products are then added together to furnish the cumulative sum of occupants admitted. An important figure for the purpose of cross-checking is the average number of occupants per vehicle and this may readily be obtained by dividing the total number of occupants admitted by the number of vehicles registered on the vehicle counter. Any discrepancy from an expected average may thereupon be investigated.

After the ticket has been purchased, movement of the car along the entranceway and over the road switch 20 or 21 terminates operation of the indicator and re-sets it in position for the next incoming vehicle. Simultaneously, the road switch 20 or 21 also operates another counter in the cabinet 32 or 33 respectively to record one vehicle admitted to the theatre.

It will be seen from the foregoing that the chances for dishonesty or error are reduced to a minimum. It is not necessary for the attendant to call out to the cashier the number of occupants of the car, inasmuch as the indicator 30 or 31 serves to inform the cashier of this figure. Furthermore, it should be remembered that one cashier is enabled to handle two traffic lanes without confusion and delay. Instead of relying on oral transmission of the ticket order, with consequent opportunity for conflict or misunderstanding, the present invention makes possible the quiet smooth operation of the process of ticket purchases by utilizing the visual indicators 30 and 31. The cashier deals with only one order at a time and makes change accordingly, undisturbed by the confusing statements of the attendants and other distractions which are inescapable where two attendants must call out to one cashier respective orders for tickets.

At the same time, the occupants may observe on the outside indicators 28 and 29 the number recorded by the attendants and can correct any discrepancy which may develop. Simultaneously, cumulative totals of admissions in various categories, namely, "one," "two," "three," etc. are kept by the counters 32 and 33. This is useful to show whether small or large parties of occupants are the more prevalent passenger groupings. It should be noted that Figs. 3 and 4 show provision for the recording of other than ordinary occupants. Guests (who must pay the Federal admission tax) and children admitted at reduced fare may be enumerated by the counters. This data also is manifest on the inside indicators 30 and 31, and on the outside indicators 28 and 29, for all interested parties to see. As in the case of ordinary occupants, the counters 32 and 33 present cumulative totals of these special categories, "guests" and "children."

It will be appreciated that the present invention also has great utility in an entrance arrangement where a single cashier-attendant takes the money, records admission, and makes change for vehicles and occupants in any one lane of a system. There the illuminating of numerals on outside indicators (here shown as 28 and 29) fulfill the purpose of informing occupants of the car of number of tickets required; the counters function in same manner; and interior indicators (here shown as 30 and 31) may be placed in the office of supervisor nearby to provide running check on the accuracy of the cashier-attendant's operation.

The electrical circuit used to effect the above result is shown partially in Fig. 2 in diagrammatic form. The system for indicating and recording four occupants is shown, as is also the system for indicating and recording six occupants on both the indicator panels and the counting machines. In addition, the method of counting the passage of vehicles by means of the operation of road switches 20 and 21 is demonstrated.

Let it be assumed that a car with four occupants approaches in the right-hand entrance lane 16 of Fig. 1, stops at the attendant located at 23, who observes that there are four occupants and accordingly depresses the button "four" on switch panel 27. As we have seen above, this will cause a light to flash behind "four" on the outside indicator 29 and behind "four" on the inside indicator 31, at the same time registering one admission in the "four" counter in the cabinet 33.

The elements accomplishing this result, shown schematically in Fig. 2, are a push-button switch 40 (corresponding to the "four" push-button on switch panel 27 of Fig. 2), a source of electrical power 42, (here shown as direct current, but equally adaptable to alternating current) indicator lamps 44 and 45 (which illuminate the figure "four" on indicator panels 29 and 31), solenoid 46, solenoid 48, and solenoid 50, and counter 52. When the attendant above momentarily closes switch 40 by depressing pushbutton "four" on switchboard 27, a circuit is completed from the negative side of the power source 42 through the switch 40 and in parallel through the indicator lamps 44 and 45 to the positive side of the power source 42.

Further tracing the circuit in Fig. 2, closing the switch 40 momentarily by depressing the push-button completes a circuit from the negative side of power source 42 through the switch 40 and the coil of solenoid 46 through the normally closed contacts of the solenoid 48 to the positive side of the power source 42. The activation of the solenoid 46 causes its contact members to close, thereupon establishing a new circuit. Let it be supposed that the switch 40 is promptly reopened after being depressed. The lamp circuits would be reopened, and it would not be possible to observe the numerals they illuminate were it not for the operation of the solenoid 46. The new circuit set up by the solenoid 46 in its activated condition may be traced from the negative side of the power source 42 through the closed contact members of the solenoid 46, through the lamps 44 and 45 in parallel and back to the positive side of the power source. Another parallel circuit is traced from the negative side of the power source 42 through the closed contacts of the solenoid 46 and thence through the solenoid winding itself, and through to the positive side of the power source 42. Therefore, once the solenoid 46 is activated by momentary closing of the switch 40 it becomes self-operating, and supplies its own winding with current to maintain the solenoid circuit and the lamp circuit in an active condition.

Still another circuit which is created by the momentary closing of the switch 40 is traced from the negative side of the power source 42 through the switch 40 to the solenoid 50 and thence to the positive side of the line at the power source 42. Completing this circuit activates the solenoid 50, which in turn registers on the attached counter-unit 52, thus recording one unit under the heading "four" in the counter system. There is no occasion to maintain this circuit in a continuously active condition. Therefore the provisions of holding the solenoid 46 in operative condition, described in the last paragraph, are not applicable to the counter solenoid 50.

The above description relates to four occupants. Let it be supposed that six occupants are to be recorded. The additional circuit elements necessary are shown in Fig. 2 as switch 60 (corresponding to push-button "six" on the switch panel 27 of Fig. 1), indicator lamps 64 and 65 (which illuminate the figure "six" on the indicator panels 29 and 31), the solenoid 66, the solenoid 70 and the counter 72. When the attendant momentarily closes the switch 60 by depressing the push-button "six" on the switchboard 27, a circuit is completed from the negative side of the power source 42 through the switch 60 and in parallel through the indicator lamps 64 and 65 to the positive side of the power source 42.

Further tracing the circuit, momentarily closing the switch 60, completes a circuit from the negative side of the power source 42 through the switch 60 and the coil of the solenoid 66 and the normally closed contacts of the solenoid 48 to the positive side of the power source 42. As has been explained above with reference to the solenoid 46, the activation of the solenoid 66 causes its contact members to close and to establish a new circuit from the negative side of the power source 42 through the closed contacts of the solenoid 66, through the lamps 64 and 65 in parallel, and back to the positive side of the power source. A second parallel circuit set up thereby is from the negative side of the power source 42, through the closed contacts of the solenoid 66 and thence through the solenoid winding itself and through the normally closed contacts of the solenoid 48 to the positive side of the power source. This represents, as we have seen above, a self-sustaining solenoid circuit. Once push-button switch 60 is closed momentarily, the solenoid 66 maintains its active condition and lights 64 and 65 remain on to illuminate the respective indicator numerals.

When push button "six" is pressed the six-unit of the counter in the cabinet 33 is operated, in a manner similar to that of the "four" unit above detailed. Closing the push button switch 60 momentarily completes a circuit from the negative side of the power source 42 through the switch 60 to the solenoid 70 and hence to the positive side of the line at the power source 42. Activation of the solenoid 70 operates the counter 72, thus recording one more unit under the heading "six" in the counter system. As we know, it is unnecessary to maintain this circuit in a continuously active condition and the holding arrangement of the solenoid 66 is not applicable to the counter solenoid 70.

The road switch 21 has been referred to from time to time, and its purpose will now be explained. The road switch circuit in Fig. 2 consists of the switch 21, the solenoid 48, the power source 74 (being identical with the power source 42), the solenoid 76 and the counter 78. When a car enters the theatre and trips the road switch 21 (a conventional model arranged to be operated only by a car moving in one direction) a circuit is established from the negative side of power source 74 through the solenoid 76 which operates the counter 78, adding one to the total number of vehicles recorded thereon, and hence back through the road switch 21 to the positive side of the line 74.

However, this circuit has aother function besides operating the vehicle counter 78. It has been pointed out above that when the push button "four" of the switch 40 is momentarily depressed the solenoid 46 energizes itself and maintains this condition, thus causing lamps 44 and 45 to remain lighted. A parallel effect was shown in connection with button "six" of the switch 60 and the associated solenoid 66 and the lamps 64 and 65. When the car has passed through the entranceway over the road switch 21 there is no longer any need for the illumination of the numerals on the indicator panels by lamps 44, 45, 64, and 65. In fact it is necessary that these panels be cleared and the lamps extinguished so as to be ready to record the occupants of the succeeding vehicle.

This is accomplished by the energization of the solenoid 48 when the road switch 21 is closed by the passage of a vehicle. The circuit is completed from the negative side of the power source 74 through the coil of the solenoid 48, through the road switch 21 and back to the positive side of the line 74. The contact members of the solenoid 48, normally closed, are caused to open by the activation of the solenoid coil. As a result, the solenoids 46 and 66 are deenergized. Tracing the circuit of the solenoid 46 will demonstrate how this happens. From the negative side of the power source 42 through the contact members of the solenoid 46, through the coil winding of the solenoid 46, and thence to the contact members of the solenoid 48 (normally closed) and back to the positive side of the power line 42, this constitutes the circuit when the solenoid 46 is "holding." However, immediately the circuit is broken by opening of contact members of the solenoid 48, the holding action of the solenoid 46 terminates; contact members of the solenoid 46 return to normal open position, and the lamps 44 and 45 are extinguished. Since the effect of activation of the solenoid 48 is identical with respect to the holding action of the solenoid 66 and its associated lamps 64 and 65, that circuit need not now be traced. It will be appreciated that when the road switch 21 closes upon the entrance of a vehicle, the indicator lamps on the right-hand side of the system will be extinguished.

The above description is limited for sake of clarity and simplicity to circuits used where four or six occupants are registered, however, circuits providing for other designations are identical and may be added freely depending upon the scope of operation desired. Moreover, only the circuits for the right-hand entranceway are outlined above. It will be realized that independent identical circuits are used in the left-hand entranceway, or in any comparable arrangement.

Reference above has been throughout to the use of tickets in connection with the operation of the admissions indicator system. However, tickets are not required in its operation. On the contrary, it should be clear that the system is particularly well adapted to utilization where tickets are not used. The need for tickets is obviated in the present invention by the road switch, automatically functioning as a recording turnstile operated by the passage of the vehicle; further the indicator numerals act as a form of visual receipt, dispensing with the requirement of a ticket for the same purpose; and, finally, the tamper-proof counters (incapable of being re-set) act as a record of admissions which furnish data for a periodic signed report. Therefore, it will be understood that an added feature of the present invention is its adaptability for situations where tickets are not used.

Having thus disclosed my invention and described in detail a preferred manner of practicing it, I claim as new and desire to secure by Letters Patent:

In a drive-in-theater admissions indicator, the following in combination; display lights indicating numbers, electrical circuits providing a source of power for the said display lights, a key system controlling the said circuits to the display lights to indicate desired numbers, passenger counting means in parallel with each of the said circuits and selectively operated when the corresponding key is actuated independently of said display light circuits, a solenoid in series with each of the said display light circuits, a parallel display light circuit closed by the said solenoid when energized by closing the key, the said parallel circuit further energizing the said solenoid to maintain itself operative and illuminating the display lights after the said key has been released, means including a road switch adapted to break the said parallel circuit, and car counting means independent from the passenger counting means actuated by the road switch, whereby visual indications of the number of car passengers will be available, but simultaneous counting of passengers will be accomplished either in combination with or independently from the said visual indications.

STANLEY S. MILLER.

REFERENCES CITED

The following references are of record in the file of this patent:

UNITED STATES PATENTS

| Number | Name | Date |
|---|---|---|
| 1,475,594 | Pierce | Nov. 27, 1923 |
| 1,823,008 | Test | Sept. 15, 1931 |
| 1,960,786 | Lomax | May 29, 1934 |
| 2,071,184 | Stewart | Feb. 16, 1937 |
| 2,094,216 | Hunter | Sept. 28, 1937 |
| 2,223,992 | Horni | Dec. 3, 1940 |
| 2,269,501 | Wiley | Jan. 13, 1942 |
| 2,276,837 | Greentree et al. | Mar. 17, 1942 |